United States Patent
Farley

(10) Patent No.: US 8,081,778 B2
(45) Date of Patent: Dec. 20, 2011

(54) VOX CIRCUIT WITH 2-WIRE INTERFACES

(75) Inventor: Joseph D. Farley, Warwick, MA (US)

(73) Assignee: SimplexGrinnell LP, Westminster, MA (US)

( * ) Notice: Subject to any disclaimer, the term of this patent is extended or adjusted under 35 U.S.C. 154(b) by 1069 days.

(21) Appl. No.: 11/940,903

(22) Filed: Nov. 15, 2007

(65) Prior Publication Data

US 2009/0129606 A1 May 21, 2009

(51) Int. Cl.
*H04R 3/00* (2006.01)
*H04L 12/28* (2006.01)
*G06F 13/00* (2006.01)

(52) U.S. Cl. ....... 381/110; 381/81; 381/86; 348/E7.051; 348/E7.053; 348/E7.081; 704/E21.004; 710/316; 710/317; 379/90.01; 379/165; 379/173; 379/202.01; 379/372; 379/377

(58) Field of Classification Search .............. 381/81, 381/86, 110; 348/E7.051, E7.053, E7.081; 704/E21.004; 710/316, 317; 379/90.01, 379/165, 173, 202.01, 372, 377
See application file for complete search history.

(56) References Cited

U.S. PATENT DOCUMENTS

| | | | | |
|---|---|---|---|---|
| 3,976,847 A | * | 8/1976 | Bidlack et al. | 379/173 |
| 4,363,936 A | * | 12/1982 | Christain et al. | 379/289 |
| 4,635,285 A | | 1/1987 | Coombes | |
| 5,070,526 A | * | 12/1991 | Richmond et al. | 379/372 |
| 6,826,647 B1 | * | 11/2004 | Leyman | 710/317 |
| 2006/0276231 A1 | | 12/2006 | Malcom | |

FOREIGN PATENT DOCUMENTS

WO   WO 99/60697 A1   11/1999

OTHER PUBLICATIONS

Communication received in corresponding EP Appln. No. 08 850 142.4 dated Oct. 6, 2010 (10 pgs).

* cited by examiner

*Primary Examiner* — Dao H Nguyen
(74) *Attorney, Agent, or Firm* — Brinks Hofer Gilson & Lione

(57) ABSTRACT

A VOX interface is provided that interfaces with at least two communication paths to two separate devices. One communication path may be to a first electronic device, such as a central monitoring station remote from the VOX interface, and another communication path may be to one or more remote devices, such as to one or more patient devices remote from the VOX interface. The VOX interface may determine which of the communication paths is sending a signal (such as an audio signal), and configure the VOX interface (via one or more switches) to pass the signal through. Specifically, the VOX interface may sense signals indicating the presence of audio from a central station audio bus and the patient station bus, may do some background noise filtering on the signals, and may pass these filtered values through a differentiator circuit to determine which bus presented the audio. Depending on which bus presented the audio, one or more switches (such as a relay) may be configured so that the audio may be passed through.

20 Claims, 2 Drawing Sheets

VOX CIRCUIT WITH 2-WIRE INTERFACES

BACKGROUND

Hospitals typically have devices in the hospital rooms for the patient to communicate with a device at a nurses' station. The hospital room device may include a microphone (or other type of transducer) to convert the patient's voice into electrical signals for transmission to a speaker at the nurses' station. The hospital room device also typically includes a speaker to receive electrical signals (converted from sounds generated at the nurses' station) and to convert the electrical signals back into sounds. Both the microphone and the speaker each usually have 2-wires to communicate so that the combination microphone/speaker device includes a total of 4-wires.

In order to determine whether a device in the system is receiving or sending a communication, the device (either the nurses' station device or the patient device) typically includes a VOX (Voice Operated eXchange) circuit. For example, if patient device includes both a microphone and a speaker (with 2-wires for each of the microphone and speaker), the patient device can itself determine whether it is receiving or sending a communication by sensing whether there is an input signal on the 2-wires for the microphone. While this type of system is workable, a need exists for a simpler system for patients to communicate with a nurses' station.

SUMMARY

A VOX interface is provided that interfaces with at least two communication paths to two separate devices. One communication path may be to a first electronic device (such as a central monitoring station remote from the VOX interface) and another communication path may be to one or more remote devices (such as to one or more patient devices remote from the VOX interface). Each of the communication paths may be separate from one another, include one or more wires and allow for bidirectional communication. For example, the central monitoring station communication path may comprise 2 wires, with each of the wires necessary for the communication (such as using the 2 wires to transmit a differential signal). The patient devices communication path may likewise comprise 2 wires to transmit a differential signal. Each of the communication paths allow for bidirectional communication (i.e., allowing for communications to/from the central monitoring station and the patient devices).

The VOX interface may determine which of the communication paths is sending a signal (such as an audio signal), and configure the VOX interface (via one or more switches) to pass the signal through. Specifically, the VOX interface may sense signals indicating the presence of audio from a central station audio bus and the patient station bus, may do some background noise filtering on the signals, and may pass these filtered values through a differentiator circuit to determine which bus presented the audio. Depending on which bus presented the audio, one or more switches (such as a relay) may be configured so that the audio may be passed through. In particular, the VOX interface may include a first signal path for passing signals from the first communication path to the second communication path (with the first signal path comprising a first buffer and the first switch) and a second signal path for passing signals from the second communication path to the first communication path (with the second signal path comprising a second buffer and the first switch). For example, in the event that the VOX interface determines that the patient station bus sent the audio signal, a relay may be configured so that signals from the patient station bus may be sent to the central station audio bus and so that signals from the central station bus are prevented from being sent to the patient station bus. By using the VOX interface, a VOX circuit need not be placed at each of the devices in the system (such as at each patient device or nurses' station device). Rather, the VOX interface, because it is acting as an interface, may perform the function of multiple VOX circuits used in the prior art.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION

Figure 2:
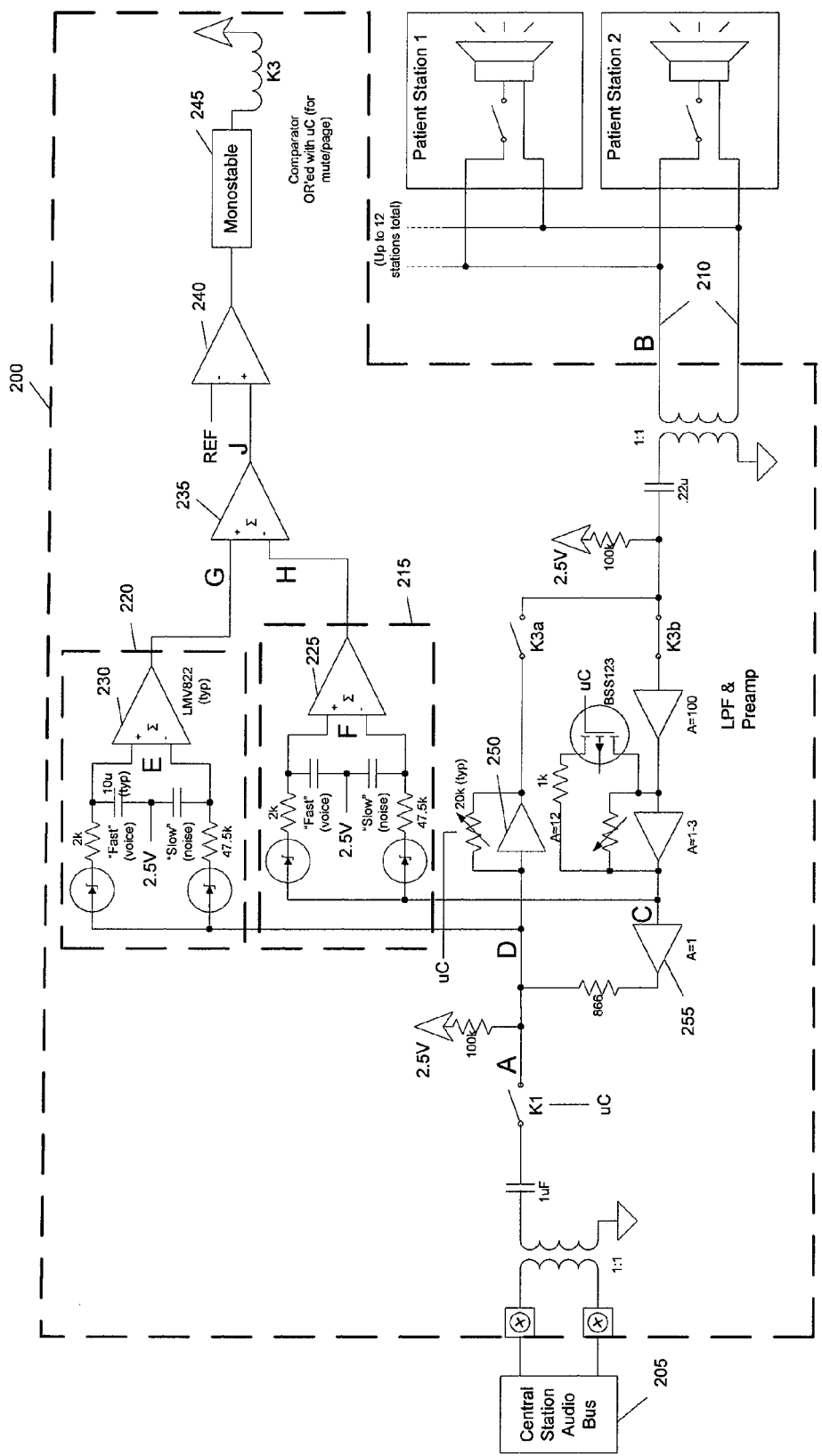
FIG. 2 illustrates a schematic of the VOX interface between a 2-wire audio bus and a 2-wire patient station bus.

As discussed in the background section, patients in different hospital rooms may wish to communicate with nurses at a nurses' station. To facilitate this, devices are placed both in the patient's room and at the nurses' station. The device in the patient's room may include a speaker/microphone. For example, the device in one configuration may comprise a microphone and in a second configuration may comprise a speaker. An example of this is depicted in FIG. 2, discussed below. The device at the nurses' station may include a centralized controller that controls communication to and from the various hospital rooms. An interface may be used to facilitate communication between the centralized controller and the devices in the patient's room. Though the interface described communicates with between a centralized controller and one or more patient devices, the interface may communicate with: a single first electronic device via a first communication path and with a single second electronic device via a second communication path; a single first electronic device via a first communication path and multiple electronic devices via a second communication path; and multiple first electronic devices via a first communication path and multiple electronic devices via a second communication path.

The interface may include a Voice Operated eXchange (VOX, or Voice Operated Transmit/Xmit). A VOX is an acoustoelectric transducer that typically includes a keying relay (or other type of switch) connected to the acoustoelectric transducer so that the keying relay is actuated when sound, or voice, energy above a certain threshold is sensed by the transducer. The VOX may include one or more switches (and electronics for controlling the switches) that operates when sound over a certain threshold is detected. It may be used to turn on a transmitter or recorder when someone speaks and turn it off when they stop speaking. It may be used instead of a push-to-talk button on transmitters or to save storage space on recording devices.

Figure 1:
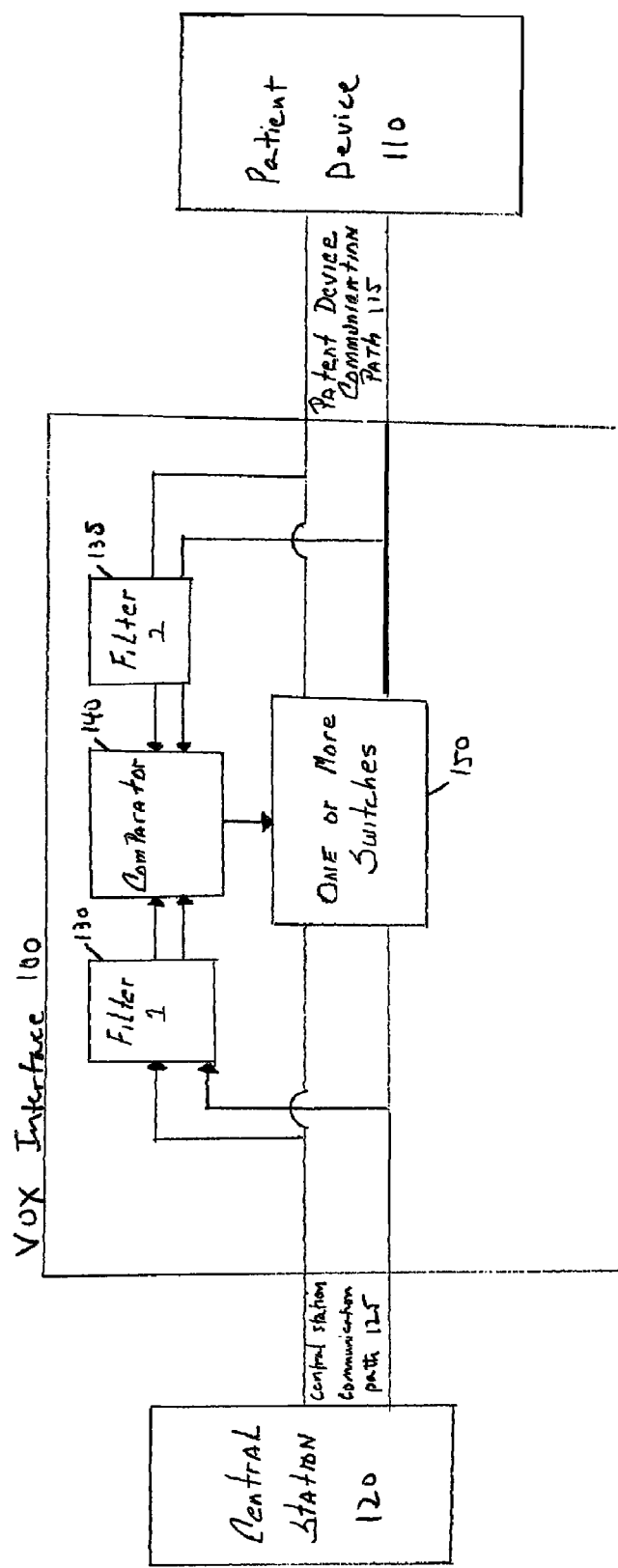
FIG. 1 illustrates one example of a block diagram of the VOX interface between a central station communication path and a patient device communication path.

FIG. 1 illustrates one example of a block diagram of the VOX interface 100 between a central station communication path and a patient device communication path. The VOX interface 100 communicates with two separate devices via two communication paths. Specifically, the VOX interface 100 interfaces with a patient device 110 via a patient communication path 115 and with a central station device 120 via a central station communication path 125. Though the example provided in the background is directed to a patient care system (with a central nurses' call station and patient devices), the VOX interface 100 may be applied to a variety of systems which have communication between a central station and one or a plurality of remote devices.

The patient device 110 includes a combination input and output device (one example of which is shown in FIG. 2 as a combination speaker and microphone). Further, the patient communication path 115 comprises one or more communication lines to provide bi-directional communication with the patient device 110 (i.e., communication to and from the patient device 110). An example of the patient communication path 115 is depicted in FIG. 2 as 2 lines (providing differential communication to and from the speaker/microphone). Likewise, the central station communication path 125 includes one or more communication lines to provide bi-directional communication with the central station device 120 (i.e., communication to and from the central station device 120).

In one example, the number of lines for the patient communication path 115 and the central station communication path 125 are the same. FIG. 2 provides an illustration of this, with 2 wire communication for the patient communication path 115 and 2 wire communication for the central station communication path 125. Because all of the wires on the patient communication path 115 and the central station communication path 125 are used for bi-directional communication (e.g., the patient communication path 115 sends communication to and receives communication from the patient device 110), the VOX interface 100 should have the ability to determine the origin of the communication (whether the communication was sent from the central station 120 or sent from the patient device 110) and to configure the VOX interface 100 accordingly to pass the communication through. For example, if the VOX interface 100 determines that the communication originated from the patient device 110, the VOX interface may configure the one or more switches 150 to pass the communication from the patient device 110 to the central station 120.

To that end, the VOX interface 100 includes Filter 1 (element 130) to filter the input from the central station communication path 125, and filter 2 (element 135) to filter the input from the patient device communication path 115. Filter 1 (element 130) and filter 2 (element 135) may reduce the noise on the central station communication path 125 and the patient device communication path 115, respectively. Though providing cleaner input signals to the comparator 140 (discussed below), filter 1 (element 130) and filter 2 (element 135) are not necessary for the VOX interface 100 to determine which device originated the communication.

The outputs of filter 1 (element 130) and filter 2 (element 135) may be sent to a comparator 140. The comparator 140 may comprise any type of device that compares two or more inputs in order to determine which of the communication paths originated the communication. As discussed below with respect to FIG. 2, one example of a comparator may comprise differentiator 235. The output of the comparator 140 indicates which of the central station communication path 125 or the patient device communication path 115 sent the communication. The output of the comparator 140 is sent to one or more switches 150. The one or more switches 150 may be configured (based on the output from the comparator 140) so that the communication may properly be passed through the VOX interface 100. For example, if it is determined that the communication was sent from the patient device 110, the one or more switches 150 are configured such that the communication is passed through to the central station communication path 125 (and without interference from any communication on the central station communication path 125).

FIG. 2 illustrates a schematic of the VOX interface 200 between a 2-wire central station audio bus 205 and a 2-wire patient station bus 210. The VOX interface 200 may sense the presence of audio from one or both of the central station audio bus 205 and the patient station bus 210, may do some background noise filtering on them (discussed in more detail below), and may pass these filtered values through a differentiator circuit (such as an analog differentiator circuit) to determine which interface presented the audio. This circuit may drive a timer that activates the VOX interface 200.

As shown in FIG. 2, there are depicted up to 12 patient devices 110. Fewer or greater patient devices 110 may be used. Switches (not shown in FIG. 2) may be used to connect one of the patient devices 110 to the 2-wire patient station bus 210. As shown in FIG. 2, one of patient devices 110 may connect to node 'B'. A desktop handset in combination with a computer (not shown in FIG. 2) may serve as the central station device 120 and may be connected to the central station audio bus 205. As shown in FIG. 2, the central station audio bus 205 may connect to node 'A' (via a winding and switch K1). Switch K1 is controlled via a microcontroller input uC. When any communication is occurring (either from the central station audio bus 205 or from the patient station bus 210), switch K1 is closed. Otherwise, switch K1 is open, isolating the central station audio bus 205 from the VOX interface 200.

Further, as discussed in more detail below, the control of relay K3 determines which of the signals is passed through the VOX interface 200. Specifically, relay K3 is a dual pole/dual throw relay (with a first switch in the relay being shown as K3*a* and a second switch in the relay being shown as K3*b*). When switch K3*a* is closed, switch K3*b* is open (and vice versa). When switch K3*a* is closed, a first audio path is created whereby the audio path travels through nodes "A," "D," and "B" to send a communication from the central station audio bus 205 to the patient station bus 210. As shown in FIG. 2, the first audio path may include a buffer 250 that may act to send signals only in one direction. The buffer 250 may comprise an amplifier or a 1:1 pass circuit element (shown in FIG. 2 as an amplifier). And when switch K3*a* is closed, K3*b* is open, thereby disconnecting communication from the patient station bus 210 to the central station audio bus 205. Likewise, when switch K3*b* is closed, a second audio path is created whereby the audio path travels through nodes "B," "C," and "A" to send a communication from the patient station bus 210 to the central station audio bus 205. As shown in FIG. 2, the second audio path may include a buffer 255 that may act to send signals only in one direction. The buffer 255, similar to buffer 250, may comprise an amplifier or a 1:1 pass circuit element (shown in FIG. 2 as a 1:1 pass circuit element). And when switch K3*b* is closed, K3*a* is open, thereby opening the first audio path and disconnecting communication from the central station audio bus 205 to the patient station bus 210. The normal rest state is depicted as shown in FIG. 2 (with K3*a* open and K3*b* closed). Relay K3 is merely one example of a switch that may be used to configure the VOX interface 200. Other types of switches may be used.

Signals are sensed at nodes "C" and "D" and sent to first filter 215 and second filter 220, respectively. First filter 215 and second filter 220 include two RC filters with different time constants (a first RC filter with a fast-response to detect fast noise sources comprising voice or other transient sounds and a second RC filter with a slow-response to generate a signal proportional to the static sound level). Differentiators 225, 230 to the right of nodes "E" and "F" subtract the static level from the transient, resulting in a signal representing only the voice content (at nodes "G" and "H").

The signals at nodes "G" and "H" (which are the filtered signals from nodes "D" and "C," respectively) are compared at differentiator 235. Specifically, differentiator 235 subtracts the signal at node "G" from the signal at node "H" and produces the subtracted output at node "J." If the signal at node "J" is positive, the output of comparator 240 is logic high, meaning that the monostable timer 245 activates relay K3 (K3a is closed and K3b is open).

In practice, if the output of the differentiator 235 at node "J" is positive, this means that the signal at node "D" is greater than the signal at node "C" (i.e., there is audio at node "D" and there is not audio at node "C"). In particular, in the rest condition as described above (with K3a open and K3b closed), audio entering at node "B" passes through the circuits shown to node "C," and also to nodes "D" and "A." Since that signal is present at nodes "C" and "D," and hence [filtered] at nodes "F" and "E," and then [differentiated] at nodes "G" and "H," the differentiator leading to node "J" subtracts to produce essentially zero at node "J," which is inadequate to exceed the reference level (REF) and trigger the monostable timer 245 beyond node "J." Note that the volume adjustment between nodes "B" and "C" may affect the signal level at node "C," therefore affecting the sensitivity of the aforementioned differentiator 235.

On the other hand, if in the rest condition there is audio stimulus present at node "A" that is not also present at node "B," the differentiation of "G" minus "H" will result in a positive value at node "J." If the magnitude of that positive value is greater than the reference level (REF), then the monostable timer 245 will be triggered and the VOX interface 200 will be active. In this condition, audio from node "A" will pass through to node "B." The monostable timer 245 is configured as a retriggerable one-shot, so that continued speech at node "A" will regularly re-trigger the monostable timer 245 and maintain the active condition. Once speech ceases at node "A" for a time greater than the one-shot's time constant, the monostable timer 245 will expire and the circuit will return to the rest state. Though FIG. 2 depicts circuit elements, part or all of the VOX interface 200 depicted in FIG. 2 may be performed by a digital signal processor.

While the invention has been described with reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A VOX interface comprising:
    a first communication path for communicating with a first electronic device remote from the VOX interface;
    a second communication path for communicating with a second electronic device remote from the VOX interface, the second communication path being different from the first communication path;
    a comparator for comparing a first signal based on a first audio signal received from the first communication path and a second signal based on a second audio signal received from the second communication path to determine whether the first electronic device sent the first audio signal or whether the second electronic device sent the second audio signal; and
    at least one switch to configure the VOX interface to pass the first signal to the second communication path if the comparator determines that the first electronic device sent the first audio signal or to pass the second signal to the first communication path if the comparator determines that the second electronic device sent the second audio signal.

2. The VOX interface of claim 1, wherein the first communication path comprises a first set of wires;
    wherein the second communication path comprise a second set of wires; and
    wherein a number of the first set of wires equals a number of the second set of wires.

3. The VOX interface of claim 2, wherein the number of the first set of wires is 2 and the number of the second set of wires is 2.

4. The VOX interface of claim 1, further comprising:
    a first filter for receiving as an input the first audio signal received from the first communication path and sending a filtered first audio signal to the comparator for comparing; and
    a second filter for receiving as an input the second audio signal received from the second communication path and sending a filtered second audio signal to the comparator for comparing.

5. The VOX interface of claim 4, wherein the first filter comprises a voice filter to filter voice and a noise filter to filter noise.

6. The VOX interface of claim 1, wherein the second communication path comprises communicating with a plurality of second electronic devices.

7. The VOX interface of claim 6, wherein the first communication path comprises communicating with a plurality of first electronic devices.

8. A VOX interface comprising:
    a first communication path for communicating with a first electronic device remote from the VOX interface;
    a second communication path for communicating with a second electronic device remote from the VOX interface, the second communication path being different from the first communication path;
    a comparator for comparing a first signal based on a signal received from the first communication path and a second signal based on a signal received from the second communication path to determine whether the first electronic device sent the first signal or whether the second electronic device sent the second signal;
    at least one switch to configure the VOX interface to pass the first signal to the second communication path if the comparator determines that the first electronic device sent the first signal or to pass the second signal to the first communication path if the comparator determines that the second electronic device sent the second signal, wherein the at least one switch comprises a first switch and a second switch;
    a first signal path for passing signals from the first communication path to the second communication path, the first signal path comprising a first buffer and the first switch; and
    a second signal path for passing signals from the second communication path to the first communication path, the second signal path comprising a second buffer and the second switch,
    wherein when the first switch is closed, the signals are passed from the first communication path to the second communication path, and
    wherein when the second switch is closed, the signals are passed from the second communication path to the first communication path.

9. The VOX interface of claim 8, wherein the first and second switches comprise a relay.

10. The VOX interface of claim 8, wherein the first and second buffers comprise amplifiers.

11. In a VOX interface comprising a first communication path for communicating with a first electronic device remote from the VOX interface, a second communication path for communicating with a second electronic device remote from the VOX interface, the second communication path being different from the first communication path, a comparator, and at least one switch, a method for passing signals through the VOX interface comprising:
    comparing with the comparator a first signal based on a first audio signal received from the first communication path and a second signal based on a second audio signal received from the second communication path to determine whether the first electronic device sent the first audio signal or whether the second electronic device sent the second audio signal; and
    configuring the at least one switch in the VOX interface to pass the first signal to the second communication path if the comparator determines that the first electronic device sent the first signal or to pass the second signal to the first communication path if the comparator determines that the second electronic device sent the second signal.

12. The method of claim 11, wherein the first communication path comprises a first set of wires;
    wherein the second communication path comprise a second set of wires; and
    wherein a number of the first set of wires equals a number of the second set of wires.

13. The method of claim 12, wherein the number of the first set of wires is 2 and the number of the second set of wires is 2.

14. The method of claim 11, further comprising:
    filtering the first audio signal received from the first communication path and sending a filtered first audio signal to the comparator for comparing; and
    filtering the second audio signal received from the second communication path and sending a filtered second audio signal to the comparator for comparing.

15. The method of claim 14, wherein filtering the first audio signal received from the first communication path and sending a filtered first audio signal to the comparator for comparing comprises voice filtering and noise filtering.

16. The method of claim 11, wherein the second communication path comprises communicating with a plurality of second electronic devices.

17. The method of claim 16, wherein the first communication path comprises communicating with a plurality of first electronic devices.

18. In a VOX interface comprising a first communication path for communicating with a first electronic device remote from the VOX interface, a second communication path for communicating with a second electronic device remote from the VOX interface, the second communication path being different from the first communication path, a comparator, and at least one switch, wherein the at least one switch comprises a first switch and a second switch, a method for passing signals through the VOX interface comprising:
    comparing with the comparator a first signal based on a signal received from the first communication path and a second signal based on a signal received from the second communication path to determine whether the first electronic device sent the first signal or whether the second electronic device sent the second signal;
    configuring the at least one switch in the VOX interface to pass the first signal to the second communication path if the comparator determines that the first electronic device sent the first signal or to pass the second signal to the first communication path if the comparator determines that the second electronic device sent the second signal;
    passing signals via a first signal path from the first communication path to the second communication path, the first signal path comprising a first buffer and the first switch; and
    passing via a second signal path from the second communication path to the first communication path, the second signal path comprising a second buffer and the second switch,
    wherein when the first switch is closed, the signals are passed from the first communication path to the second communication path, and
    wherein when the second switch is closed, the signals are passed from the second communication path to the first communication path.

19. The method of claim 18, wherein the first and second switches comprise a relay.

20. The method of claim 18, wherein the first and second buffers comprise amplifiers.

* * * * *